US009140628B2

(12) United States Patent
Symens et al.

(10) Patent No.: US 9,140,628 B2
(45) Date of Patent: Sep. 22, 2015

(54) SYSTEM FOR CHARACTERIZING TIRE UNIFORMITY MACHINES AND METHODS OF USING THE CHARACTERIZATIONS

(71) Applicant: Akron Special Machinery, Inc., Akron, OH (US)

(72) Inventors: Ronald E. Symens, Sioux Falls, SD (US); Byron R. Stanoszek, Hinckley, OH (US); Troy L. Anenson, Uniontown, OH (US); Daniel P. Furst, Cuyahoga Falls, OH (US); Jason A. McIntyre, Akron, OH (US)

(73) Assignee: AKRON SPECIAL MACHINERY, INC., Akron, OH (US)

( * ) Notice: Subject to any disclaimer, the term of this patent is extended or adjusted under 35 U.S.C. 154(b) by 0 days.

(21) Appl. No.: 13/943,995

(22) Filed: Jul. 17, 2013

(65) Prior Publication Data

US 2013/0298656 A1  Nov. 14, 2013

Related U.S. Application Data

(63) Continuation-in-part of application No. 13/370,541, filed on Feb. 10, 2012, now Pat. No. 8,701,479.

(51) Int. Cl.
  *G01M 17/02* (2006.01)
(52) U.S. Cl.
  CPC ............ *G01M 17/02* (2013.01); *G01M 17/021* (2013.01); *G01M 17/022* (2013.01)
(58) Field of Classification Search
  None
  See application file for complete search history.

(56) References Cited

U.S. PATENT DOCUMENTS

| | | | |
|---|---|---|---|
| 4,305,072 A | 12/1981 | Makita | 340/870.31 |
| 4,366,707 A | 1/1983 | Jarschel | 73/146 |
| 4,404,848 A | 9/1983 | Iwama et al. | 73/146 |
| 4,704,900 A | 11/1987 | Beebe | 73/146 |
| 4,742,332 A | 5/1988 | Schroeder et al. | 340/347 P |
| 4,805,125 A | 2/1989 | Beebe | 364/570 |
| 4,852,398 A | 8/1989 | Cargould et al. | 73/146 |
| 4,955,229 A | 9/1990 | Himmler | 73/146 |
| 5,027,649 A | 7/1991 | Himmler | 73/146 |
| 5,309,377 A | 5/1994 | Beebe | 364/571.04 |
| 6,016,695 A | 1/2000 | Reynolds et al. | 73/146 |
| 6,229,302 B1 | 5/2001 | Varady et al. | 324/207.25 |
| 6,405,591 B1 | 6/2002 | Colarelli, III et al. | 73/462 |

(Continued)

FOREIGN PATENT DOCUMENTS

EP  2 626 684 A2  8/2013  ............ G01M 17/02

OTHER PUBLICATIONS

Office Action issued Aug. 1, 2013 in corresponding U.S. Appl. No. 13/370,541.

(Continued)

*Primary Examiner* — Andre Allen
(74) *Attorney, Agent, or Firm* — Renner Kenner Greive Bobak Taylor & Weber

(57) ABSTRACT

A tire uniformity machine includes an apparatus for receiving and rotating a tire. The apparatus includes opposed spindles for receiving, inflating and rotating a tire, and a load wheel applied to the rotating tire to obtain tire test results. A spindle alignment assembly is associated with the opposed spindles to align the spindles with one another each time a tire is received. At least one characterizing device is associated with components of the apparatus to characterize forces of the opposed spindles and the characterized forces are used in adjusting tire test results.

14 Claims, 12 Drawing Sheets

(56) References Cited

U.S. PATENT DOCUMENTS

| | | | |
|---|---|---|---|
| 6,481,282 B2 | 11/2002 | Douglas et al. | 73/461 |
| 6,915,684 B2 * | 7/2005 | Beebe et al. | 73/146 |
| 7,213,451 B2 | 5/2007 | Zhu et al. | 73/146 |
| 7,434,454 B2 | 10/2008 | Matsumoto | 73/146 |
| 8,701,479 B2 * | 4/2014 | Symens et al. | 73/146 |
| 2003/0061719 A1 * | 4/2003 | Gerdes | 33/203.13 |
| 2003/0196483 A1 * | 10/2003 | Beebe et al. | 73/146 |
| 2005/0081614 A1 | 4/2005 | Zhu | 73/146 |
| 2011/0221086 A1 * | 9/2011 | Hair et al. | 264/40.1 |
| 2013/0253686 A1 * | 9/2013 | Flament et al. | 700/117 |
| 2013/0298657 A1 * | 11/2013 | Stanoszek et al. | 73/146 |

OTHER PUBLICATIONS

*Precision Gear Tooth Encoders*; CONTREX; Copyright 2010; pp. 1-12; http://idcintegration.net/wp-content/uploads/2012/11/CONTREX-DS53-3A-Web.pdf.

European Search Report mailed Dec. 15, 2014 in related application No. EP 14002441.5.

European Search Report mailed Dec. 15, 2014 in related application No. EP 14002442.3.

\* cited by examiner

SYSTEM FOR CHARACTERIZING TIRE UNIFORMITY MACHINES AND METHODS OF USING THE CHARACTERIZATIONS

CROSS-REFERENCE TO RELATED APPLICATIONS

This application is a Continuation-In-Part application of U.S. patent application Ser. No. 13/370,541 filed Feb. 10, 2012, which is incorporated herein by reference.

TECHNICAL FIELD

The present invention relates generally to tire testing equipment. In particular, the present invention relates to characterizing components of a tire uniformity machine. Specifically, the present invention relates to using characterizations of the tire uniformity machine for evaluating tires during normal testing procedures.

BACKGROUND ART

Ideally, a tire is desirable to be a perfect circle, and interior stiffness, dimensions and weight distribution and other features thereof should be uniform around the circumference of the tire. However, the usual tire construction and manufacturing process make it difficult to mass produce such an ideal tire. That is, a certain amount of nonuniformity in the stiffness, dimensions and weight distribution and other features occur in the produced tire. As a result, an undesirable exciting force is produced in the tire while the vehicle is running. The oscillations produced by this exciting force are transmitted to the vehicle chassis and cause a variety of vehicle oscillations and noises including shaking, fluttering, and sounds of the tire vibrations being transmitted inside the vehicle.

Industry standards are available for evaluating nonuniformity of a tire. In one method, a rotating drum, which serves as a substitute for the road surface, presses against a rotatably held tire with a predetermined pressing force (several hundred kilograms), or the tire is pressed against the rotating drum with the predetermined pressing force. The tire and the rotating drum are capable of rotating around their respective rotational axes, in such a way that when either one rotates, the other is also caused to rotate.

In this condition, the tire or the rotating drum is rotatably driven so that the tire rotates at 60 revolutions per minute. As the tire rotates, the exciting force produced by nonuniformity of the tire occurs. This exciting force is measured by one or more force measuring devices (such as a load cell) mounted on a bearing which rotatably supports the tire or the rotating drum, or mounted on a member attached to this bearing. From the measured value, an index that serves to evaluate the nonuniformity of the tire is computed. This measurement is referred to as a uniformity measurement.

Tires on which measurements were performed are classified into those for which the nonuniformity obtained from the index is within tolerable limits and those for which it is not. To the extent possible, tires for which the nonuniformity is outside of the tolerable limits are subjected to processing to decrease the nonuniformity. Tires that have been processed are then subjected to uniformity measurement again; those for which the nonuniformity is within tolerable limits are separated from those for which it is not. Through the procedure described above, only tires judged to have "nonuniformity within tolerable limits" are selected and shipped to customers (or sent to the next step in the tire evaluation procedure).

Although current tire uniformity machines are believed to be effective, it is believed that further improvements can be obtained. Current tire uniformity machines provide test results that are sometimes inconsistent. In determining whether a uniformity machine is reliable, a same tire will be tested five times to ensure that the machine consistently detects and measures any nonuniformities in the tire. An additional sampling of tires are also then subjected to the same uniformity tests. From this collection of test results, various filters can be generated and applied to production tires to filter actual results. As skilled artisans will appreciate, filtering the test results undesirably adds time to the test procedure. Filtering also raises concerns that the filters may be set to exclude tires that are acceptable and, more problematically, tires that are not acceptable may be passed to allowance.

One approach is to generate characterization plots of components of the tire uniformity machine that adversely affect the true uniformity of the tire under test. It has been determined that the forces applied by components of the uniformity machine each have their own unique characteristic that varies from machine to machine. For example, the rotating drum on one uniformity machine has a different characteristic than another rotating drum on a different machine. It is believed that each rotating drum that contacts the tire's surface and each upper and lower spindle and chuck assembly that engages the tire's bead has a unique force characteristic that contributes errors into the uniformity measurements detected by the machine It is also believed that prior attempts to adequately characterize the load wheel and the spindle characterization are deficient. In particular, prior methods did not adequately consider differences between the angular alignment or rotational position of the upper and lower spindle and chuck assemblies. As a result, different angular alignments of the spindle and chuck assemblies result in force contributions to a tire uniformity measurement that are not adequately filtered or that distort the filtered measurements in a way that does not accurately represent a tire uniformity measurement. Therefore, there is a need in the art to generate an accurate characterization of the spindle and chuck assemblies and a need in the art to consistently align the upper and lower chuck assemblies so that the characterization can be consistently applied to tires being tested.

SUMMARY OF THE INVENTION

In light of the foregoing, it is a first aspect of the present invention to provide a system for characterizing tire uniformity machines and methods of using the characterizations.

It is another aspect of the present invention to provide a tire uniformity machine, comprising an apparatus for receiving and rotating a tire, the apparatus including opposed spindles for receiving, inflating and rotating the tire, and a load wheel applied to the rotating tire to obtain tire test results, a spindle alignment assembly associated with the opposed spindles to align the spindles with one another each time a tire is received, and at least one characterizing device associated with components of the apparatus to characterize forces of the opposed spindles, wherein the characterized forces are used in adjusting tire test results.

It is yet another aspect of the present invention to provide a method for testing tires, comprising receiving at least one control tire at a time in an apparatus, each control tire having a known characteristic, angularly aligning spindles for each at least one control tire received to a same angular position, applying a load wheel to the at least one control tire and generating a load wheel force, detecting an angular position of the load wheel, correlating the angular position of the load wheel with the load wheel force, and generating a characteristic waveform of the spindles from the angularly aligned spindles, the angular position of the load wheel, and the load wheel force.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
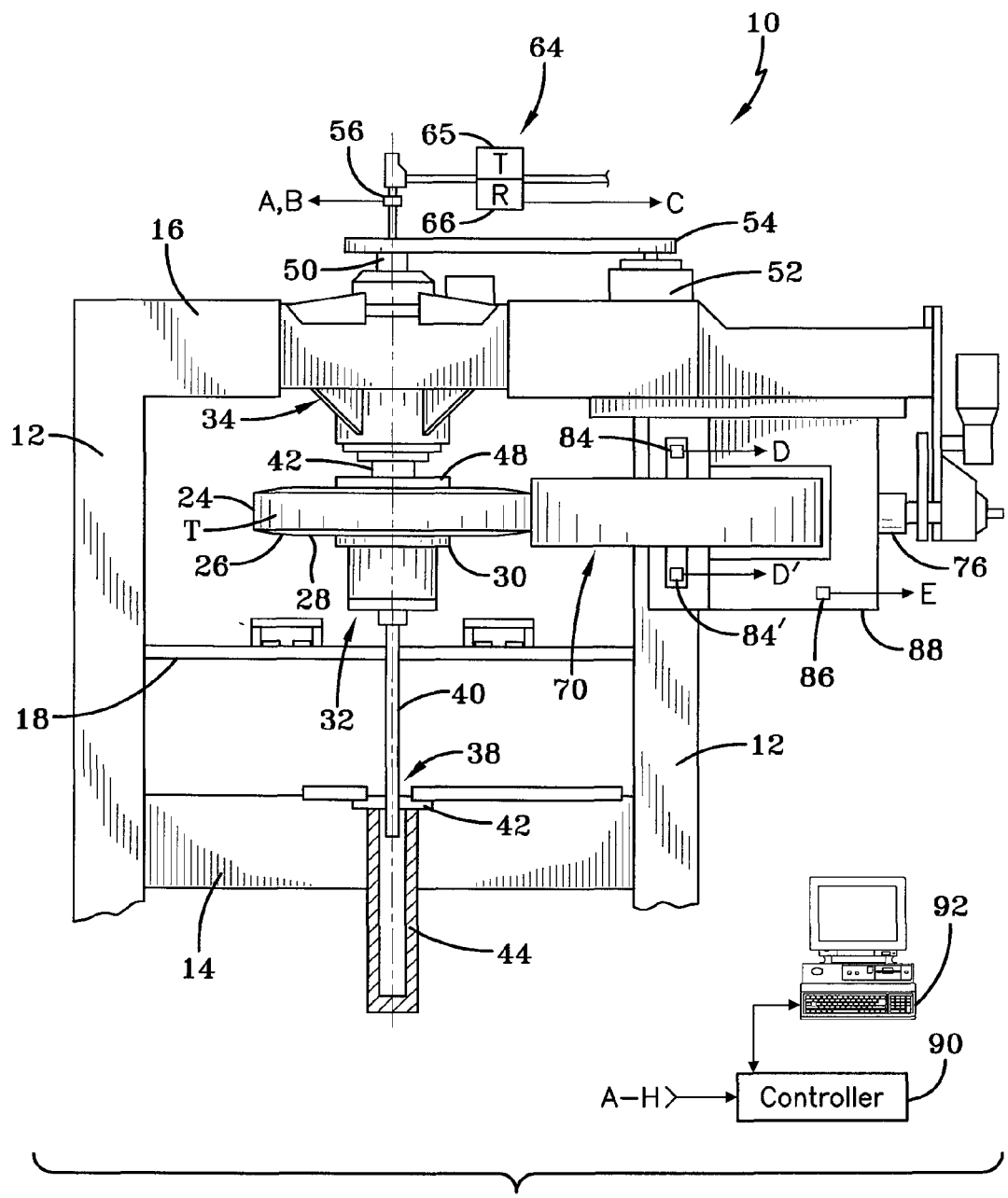
FIG. 1 is a schematic diagram of a tire uniformity machine according to the concepts of the present invention.

Referring now to the drawings and in particular to FIG. 1, it can be seen that a tire uniformity machine is designated generally by the numeral 10. The machine includes side frame members 12 which are connected at respective ends by a horizontal bottom frame member 14 and a horizontal top frame member 16. The side frame members 12 and frame members 14 and 16 form a box-like structure within which a tire, designated generally by the capital letter T is received, tested and discharged.

A conveyor 18 is configured with rollers which have openings therebetween upon which the tire T is delivered to the machine 10. Each tire T includes a tread 24 adjacent substantially parallel sidewalls 26 which have beads 28 forming an inner diameter of the tire. The machine 10 includes an apparatus for receiving and rotating the tire and, in particular, a lower spindle and chuck assembly 32 and an upper spindle and chuck assembly 34. Both the lower and upper spindle and chuck assemblies are outfitted with removable rims 30 and 48 which can be in various sizes as needed to fit the bead diameter of a tire. The lower spindle and chuck assembly 32 is carried and supported by the frame members 12 and 14 and is positioned so as to engage the tire as it is supported by the conveyor 18. In particular the lower spindle and chuck assembly 32 includes a hydraulic unit 38 which provides a shaft 40 that maintains a piston 42 contained within a cylinder 44. At the appropriate time, the hydraulic unit engages the tire and, in particular the lower bead 28, through an opening in the conveyor 18 so as to move the tire into a testing position.

The upper spindle and chuck assembly 34 receives the other side of the tire T on the rim 48 when the lower spindle and chuck assembly engages the facing sidewall 26 at the bead 28 of the tire on the rim 30 attached to the lower spindle and chuck assembly. The spindle and chuck assembly 34 includes a rim 48 which is rotated by a spindle 50, and the assembly 34 may also include spindle bearings, a rim adapter and other associated components. The spindle 50 is driven by a motor 52 and an interconnecting belt drive 54 which connects the spindle 50 to the motor.

Briefly, in operation, the tire is delivered along the conveyor 18 and stopped at the appropriate position so that the lower spindle and chuck assembly can engage the lower facing side of the tire T. The lower rim assembly then moves the tire into engagement with the upper rim assembly, whereupon the tire is inflated and then rotated to initiate the testing process.

A tire encoder 56 is carried by the upper spindle 50 to monitor the rotational position of the tire T during rotation. The encoder 56 generates a signal A dividing the tire circumference into equal segments and a signal B indicating a fixed single position on the circumference at any given point in time. As such, operation of the motor may be monitored by the encoder 56.

A tire inflation system 64 includes an air pressure transducer 65 which monitors the air pressure of the tire and an air pressure regulator 66 to regulate the tire pressure to a desired pressure. As previously indicated, after the chuck assemblies engage the tire, the tire is inflated by the inflation system to a desired pressure prior to testing of the tire. The air pressure transducer 65 generates a pressure signal C.

Figure 2:
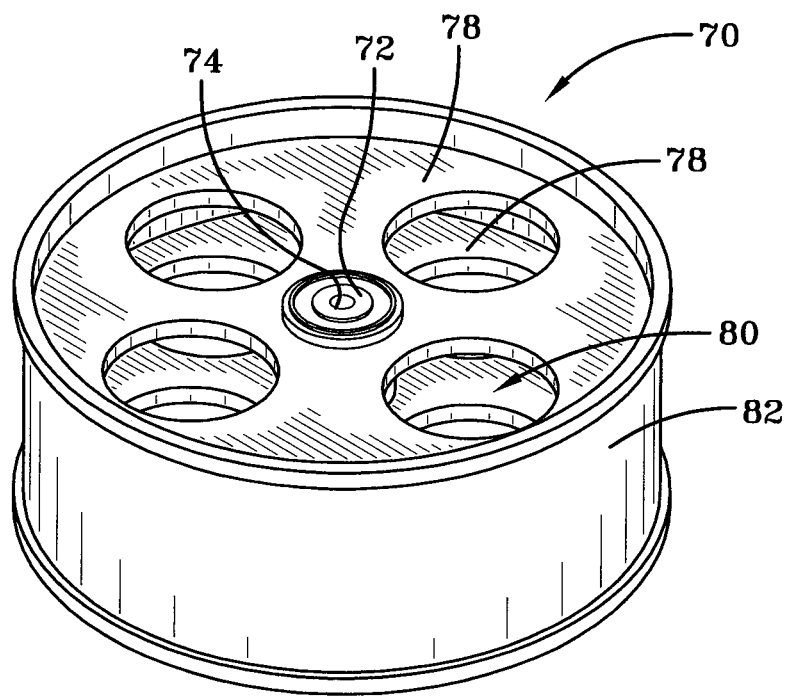
FIG. 2 is a perspective drawing of a load wheel used in the tire uniformity machine.

A load wheel 70 moves horizontally into and out of contact with the tire T so as to apply a load to the tire and test for tire uniformity. As best seen in FIG. 2, the load wheel includes a shaft 72 having a hole 74 therethrough. The load wheel is constructed with at least two substantially parallel spaced apart plates 78, but it will be appreciated that a single plate or multiple plates could be used. Each plate 78 may be provided with a number of openings 80 so as to reduce the weight of the load wheel. The outer diameter of the plates 78 support a radial surface 82 which engages the tire tread as shown in FIG. 1.

Skilled artisans will appreciate that the overall construction of the load wheel, including the materials, welds, machining and the like, affects the characteristics and operation of the load wheel 70 and, in turn the machine 10. The same construction concerns are also applicable to the other components of the machine 10 that contact and engage the tire—the upper spindle and chuck assembly 34, the upper rim 48, the lower spindle and chuck assembly 32, the lower rim 30 and the tire inflation system 64. All of these components, no matter how slight, impact the test data collected from the tire during its testing process.

Returning back to FIG. 1, it can be seen that the load wheel is mounted within a carriage 88, which is maintained by the frame members, and moved into and out of position to engage the tire by a motor and gearing assembly 76 also carried by the frame members 12. At least one load cell 84 is associated with the load wheel 70 and detects the forces exerted by the tire on the wheel during rotational movement. Each respective load cell generates a load cell signal D and D'. It will be appreciated that a single load cell may be used but that additional load cells 84 may be provided to confirm the readings of the first load cell signal, or share the force of the load, or to detect slight variations in the tire construction.

A load wheel encoder 86 is carried by the carriage 88 so as to monitor the rotational or angular position of the load wheel. The encoder 86 generates an encoder signal E.

A computer 92, through a controller 90, receives the signals A-E so as to characterize the particular components of the tire uniformity machine and/or acquire other detected measurements generated during the tire testing process. As such, these signals perform their known function of monitoring the variable forces exerted by the tire under test and also to analyze the components of the tire uniformity machine which apply forces to the tire during testing. The controller 90 is also used to generate signals that operate the motors, valves, servos, and conveyors needed to move the tire T into the machine and ready it for testing. The controller 90 is connected to a computer 92 which can display and collect the data and also manipulate and analyze the data collected as represented by the signals A-F and any other data signals collected. Skilled artisans will appreciate that the controller 90 and computer 92 may work in tandem or separately to control components of the machine 10 and process and present the data collected into a format usable by manufacturing personnel. Moreover, both the computer and the controller include the necessary hardware, software and memory needed to implement and carry out the operations of the machine 10 and the characterization processes to be described.

Generally, the monitoring of the particular components of the tire uniformity machine is done to characterize the machine's mechanical behavior, whereupon the computer removes the unwanted influences caused by the machine's mechanical condition during production tire testing. Utilization of the machine characterizations determines whether a detected measurement is suitable for use as a valid test result and then, with an analysis based on the machine's mechanical characterization, unwanted waveform properties can be removed which are attributable to the machine's mechanical parts, its measurement apparatus and so on. These unwanted waveform properties can now be specifically identified by the computer and software processes. As such, the unwanted portions of the waveforms that detract from both the precision of the measurement and its conformance (repeatability) to prior measurements can be adjusted for.

Figure 3:
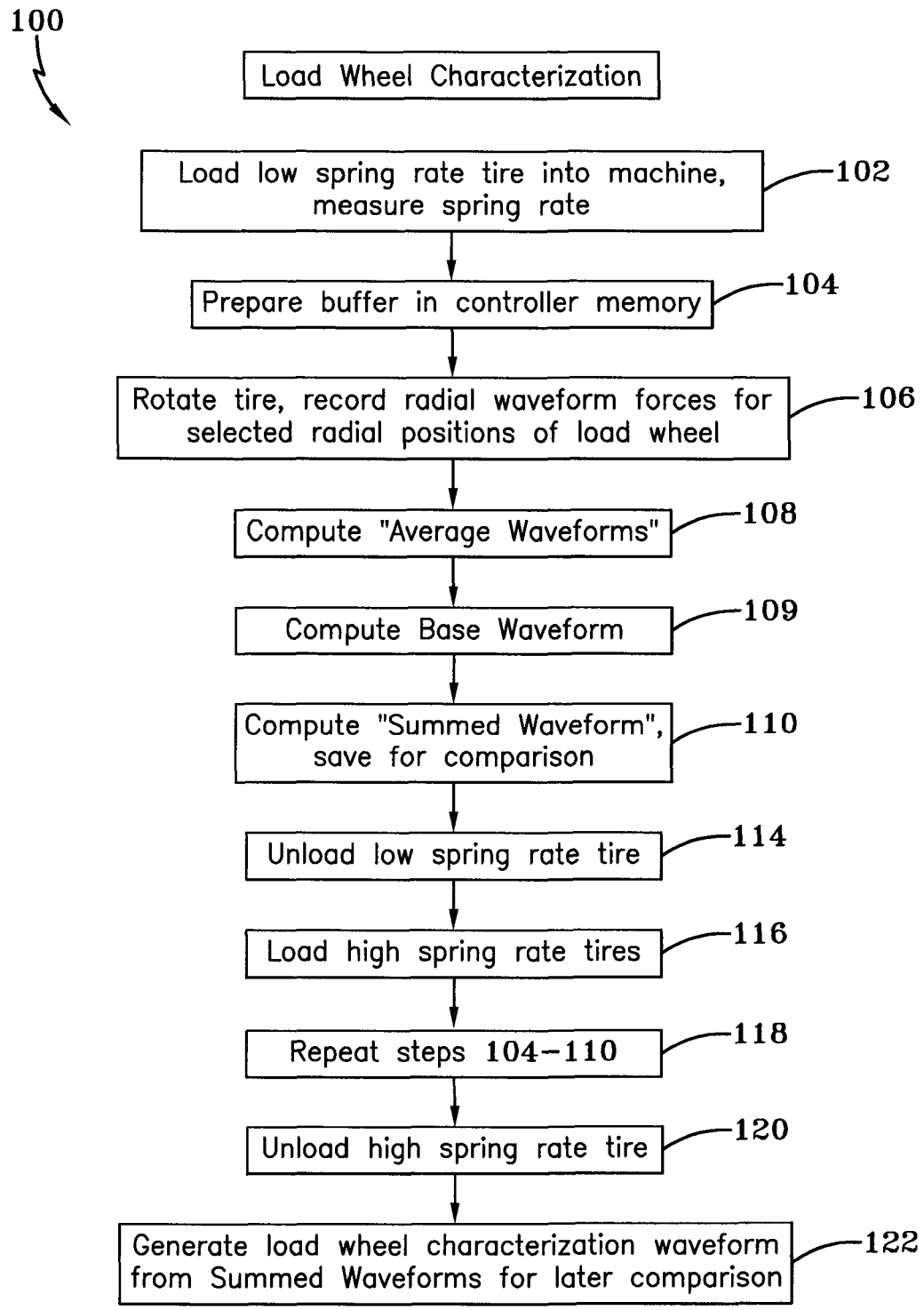
FIG. 3 is a flow chart showing a load wheel characterization process according to the concepts of the present invention.

In order to implement the characterization process, reference is now made to FIG. 3, wherein a load wheel characterization process is designated generally by the numeral 100. In this process, a low spring-rate tire, which has a known spring-rate value, is loaded into the machine. For example, an 800 pounds/inch spring-rate tire is loaded into the machine 10 at step 102. Next, at step 104 the computer 92, which maintains a buffer memory and which provides the needed hardware, software and other memory components to implement the characterization process, prepares a buffer for receipt of data collected by any of the components of the tire uniformity machine and, in particular signals A-E and specifically the load cell signals D, D' and the encoder signal E. As used herein, the "spring-rate" is the increase in radial force as measured on a loaded and inflated tire, for each unit of distance the load wheel advanced toward the spindle that carries the rotating tire.

As a load wheel can never be perfectly round, any amount of run out imposed onto a rotating tire by the load wheel thus exerts a measurable radial force directly relating to the tire's spring-rate. For a division of N evenly-spaced angles around the load wheel, this force is measured and compiled into a waveform of N points that characterizes the force effect of the load wheel at that specific spring-rate. Any number of N points could be used, but in most embodiments at least one hundred N points are required. Accordingly, after the buffer prepared in step 104 is ready, the machine rotates the tire, records the angular waveform forces at various angular positions of the load wheel at step 106.

During the loading process of the present embodiment, it will be appreciated that the tire is allowed to spin for at least one hundred revolutions so as to allow the tire to warm up and settle into a static position on the load wheel. After the buffer has been established, the tire is allowed to spin for at least six hundred more revolutions whereupon an M-point radial force waveform (usually 100 points), in terms of M evenly-spaced angles around the tire, and the rotational position of the load wheel at the beginning of each waveform collection, in terms of N evenly-spaced angles around the load wheel, are recorded for each revolution. Next, at step 108, the computer computes an N-waveform "Average Waveforms" buffer. This is done by examining the saved rotational position of the load wheel for each waveform recorded. This rotational position is rounded to the nearest integer modulo N, and this is designated as position P. For each position P, the computer 92 computes the mean of all waveforms that were collected where the beginning rotational position of the load wheel is P. This resulting average waveform is then stored as the $P_{TH}$ waveform of the "Average Waveforms" buffer.

Next, at step 109, the computer 92 computes a "Base Waveform." This is done by calculating the mean of all waveforms stored across all indexes of the N-waveform "Average Waveforms" buffer, and storing the result as the "Base Waveform."

Next, at step 110, the computer 92 computes a N-point "Summed Waveform" and saves this in the appropriate memory file in the computer 92 for later comparison. In particular, for each of the N waveforms in the "Average Waveforms" buffer, there exist M points of data (beginning at load wheel position P) that contain radial force plus load wheel run out by virtue of how the waveform was recorded. To extract this load wheel run out, the following steps are performed by the computer. For each index Q (from zero to M−1) in each of the N waveforms in the "Average Waveforms" buffer, the load wheel position for that point is determined by the equation (P+Q×N+(number of load wheel angles occupied by one revolution of the tire, in terms of N)) rounded to the nearest integer modulo N, and this is designated index S. The point at the $Q_{TH}$ index in each of the N waveforms is subtracted by the point at the $Q_{TH}$ index of the "Base Waveform" and is then added to the $S_{TH}$ index in the "Summed Waveform," and at the same time a count of values for the $S_{TH}$ index is also incremented. After the loop is completed, the point at each index of the "Summed Waveform" is divided by the total count of values added to that index, thus computing the average of the points added to each individual index in the "Summed Waveform." Finally, the computer saves the resulting "Summed Waveform" and spring-rate value from step 102 to the computer's memory as the final load wheel characterization for the chosen spring-rate tire.

At step 114 the low spring-rate tire is unloaded from the machine 10. Next, at step 116 a high spring-rate tire is loaded into the machine. For example, the high spring-rate tire may have a 1,450 pounds/inch$^2$ spring-rate.

Then, at step 118 steps 104-110 are repeated for the high spring-rate tire so as to collect corresponding Average Waveforms and Summed Waveforms for the high spring-rate tire. Next, at step 120 the high spring-rate tire is unloaded.

Figure 4:
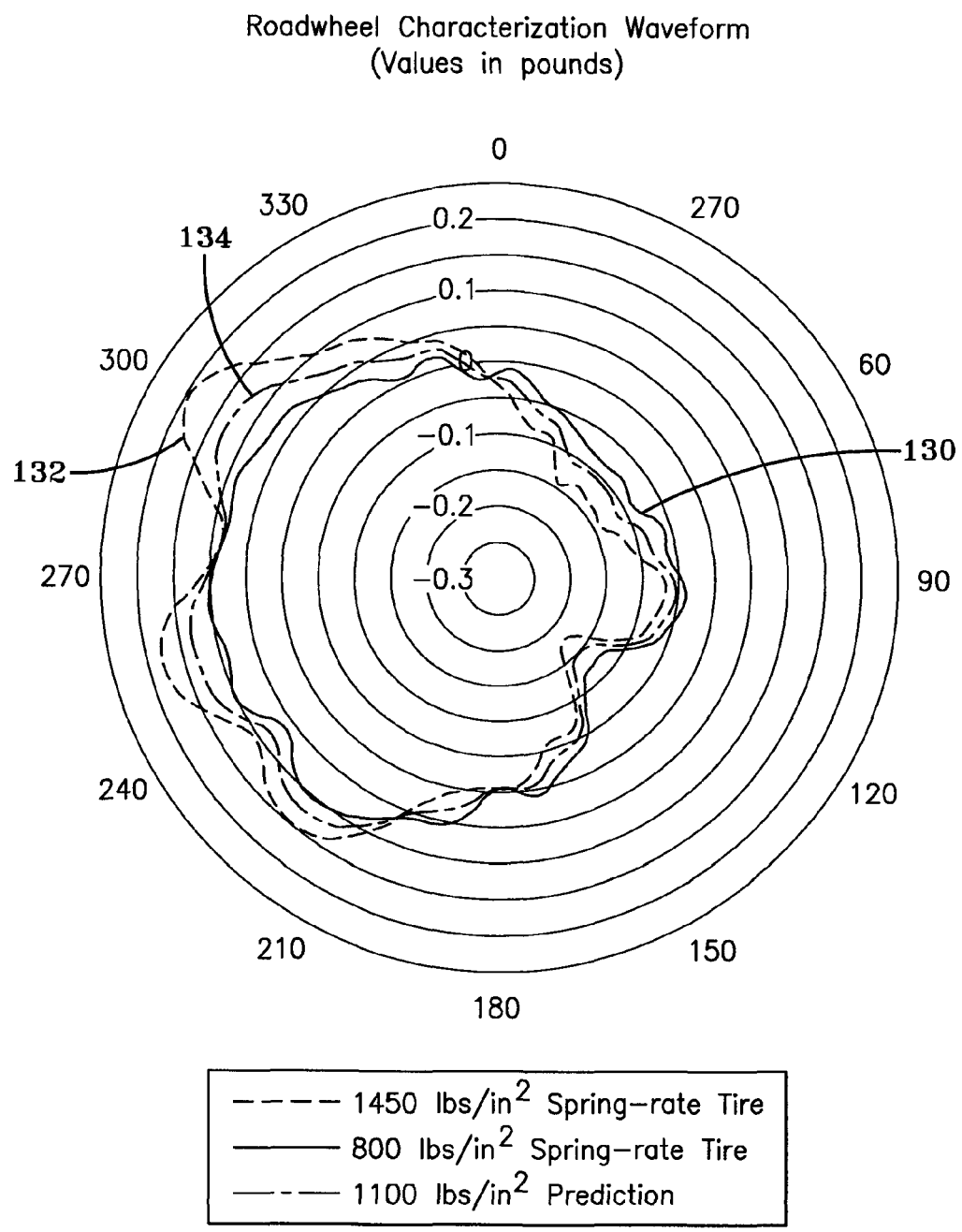
FIG. 4 is a load wheel characterization waveform utilizing known spring-rate tires to obtain a prediction waveform used in the analysis of tires being tested by the tire uniformity machine.

At step 122 a load wheel characterization waveform from the Summed Waveforms for later comparison is generated. The resulting load wheel characterization waveform can then be applied to the current tire being tested. This is done by subtracting the load wheel characterization waveform from the recorded tire test waveform. Referring now to FIG. 4, it can be seen that characterization waveforms for the low spring-rate tire, designated generally by the numeral 130, and the high spring-rate tire, designated generally by the numeral 132, are shown. These characterizations illustrate the particular out-of-roundness of the load wheel of the machine 10. As such, it will be appreciated by skilled artisans that each load wheel has a different characterization waveform when tested with a low spring-rate tire and a high spring-rate tire. In any event, these two high and low spring-rate waveforms can be extrapolated to predict a characterization waveform associated with a medium spring-rate tire. It is these median spring-rate tires that will be under test by the tire uniformity machine and this prediction value can be utilized to adjust the uniformity measurements detected by the load cells under a normal test.

As used herein, the term spindle characterization refers to the characterization of the entire upper spindle, spindle bearings, rim adapter (which is referred to in this description as upper chuck) and the rim. The basic idea of spindle characterization is that the spindle runs out just like the load wheel, and the amount of run out observed in the resulting radial force test waveform is directly correlated to the spring rate of the tire, just as in the load wheel. However, the spindle characterization is different than that of the load wheel, because the tire is mounted "to" the spindle. Thus the ratio of tire position to spindle position is always 1:1. This ratio being different is why a load wheel characterization can be obtained by spinning the tire 600 times and measuring where it lands in different locations on a load wheel. As a result, different methodologies have been developed to measure the spindle characterization.

For both methods disclosed herein, consider that a tire has a spring-rate, which is defined in terms of lbs of radial force seen by the load wheel for each inch the load wheel moves into the tire toward the spindle. During a test, when the load wheel position is fixed in place, an out-of-round spindle and/or rims will also push the tire toward or away from the load wheel in a repeating fashion with a frequency equal to one revolution of the tire. It can be directly assumed/concluded that the non-constant orbiting of the spindle, combined with the runout of both the upper and lower rims holding the tire, creates a radial force waveform that is added to each test waveform of the tire during testing, resulting in inaccurate test results. The following procedures describe how to calculate (characterize) this spindle waveform. Once characterized, the waveform can be mathematically subtracted out of the test data, which results in increased accuracy of the test data.

Figure 5A:
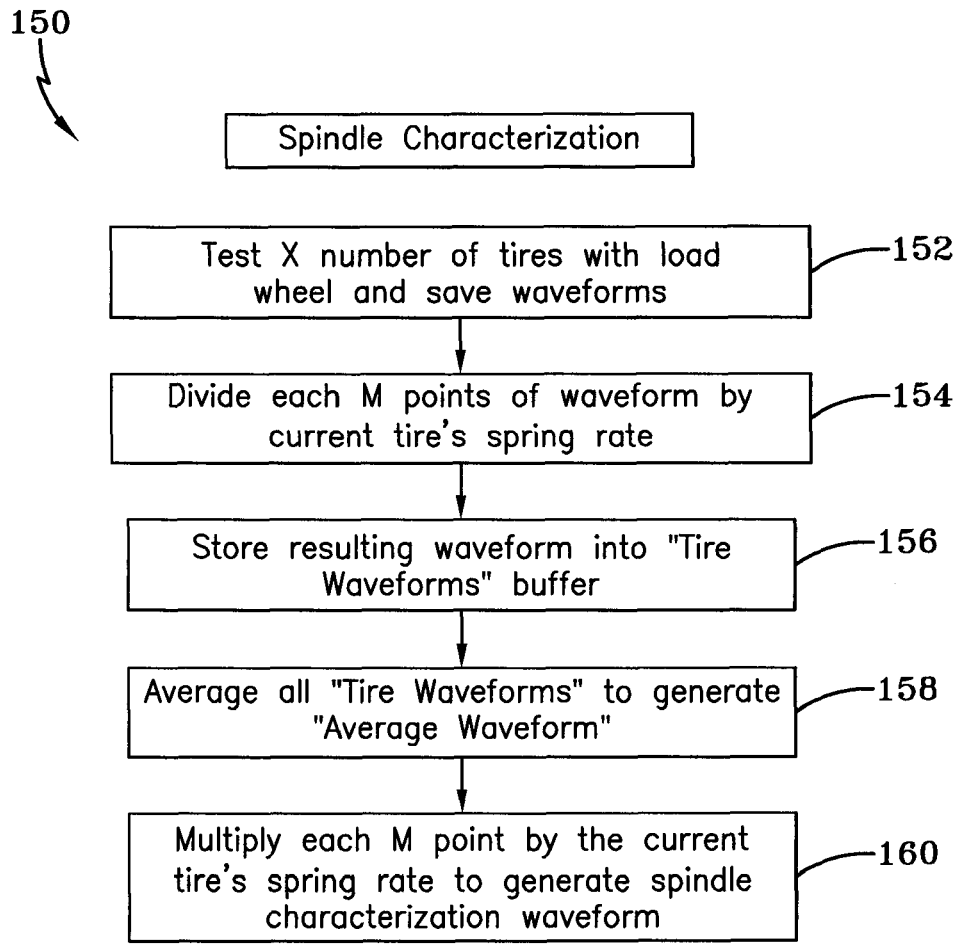
FIG. 5A is a flow chart showing a spindle characterization process according to the concepts of the present invention.

Referring now to FIG. 5A, one embodiment of a spindle characterization process is designated generally by the numeral 150. In this process, a large number (L) of tires are tested so as to generate a table of waveforms that can be normalized based upon the spring-rate of a tire. Although L can represent any number, it is believed that the value of L should be at least 750 to provide an accurate spindle characterization. In any event, by using an average from the table of waveforms, the controller or computer can compute a spindle characterization waveform that can be used directly to subtract from the recorded test waveform and produce an accurate picture of the tire's properties.

The process 150 starts at step 152 where a large number of tires are tested by the load wheel 70 and the waveforms for each tire tested are saved in a buffer. This buffer may be referred to as "Tire Waveforms." As in the load wheel characterization process, each waveform may be correlated to M positions around the tire as detected by the tire encoder 56. It will be appreciated in the present embodiment that each test waveform has the load wheel characterization procedure already factored out of its waveform. Although in some embodiments, only the spindle characterization waveform may be used to adjust the waveform of a tire being tested. In any event, no spindle characterization is factored out at this time. At step 154, each M point in the test waveform is divided by the spring-rate of the tire currently under test. In some embodiments, the tire currently under test may also be referred to as a control tire that is used in populating the "Tire Waveforms" buffer. In step 154, all of the tire waveforms in the Tire Waveforms buffer are normalized to the same spring-rate. In other words, as each tire is tested, that tire's spring-rate is used to divide each data point of the newly-inserted waveform. Skilled artisans will appreciate that the spring-rate of the tire under test is determined by the signals D, D' generated by the load cells 84, 84'. At step 156, the resulting waveform is stored in the next available index in the "Tire Waveforms" buffer. If all of the entries in the "Tire Waveforms' buffer are filled, then the oldest waveform test result is deleted from the buffer and the newest waveform, i.e. the one being added, is kept so that there are always L entries in the "Tire Waveforms" buffer.

At step 158, once the "Tire Waveforms" buffer has L entries, that buffer can be used to calculate the spindle characterization. This is accomplished by taking the average of all L waveforms in the "Tire Waveforms" buffer and calling this the "Average Waveform." At step 160, each M point in the "Average Waveform" is then multiplied by the spring-rate of the tire currently under test. In other words, the normalized average of the Average Waveform is multiplied by the current tire's spring-rate. This results in generation of a spindle characterization waveform based on the current tire's spring-rate.

With the resulting spindle characterization waveform, the waveform can be applied to the current tire being tested. This is done by subtracting the spindle characterization waveform from the recorded tire test waveform.

Figure 5B:
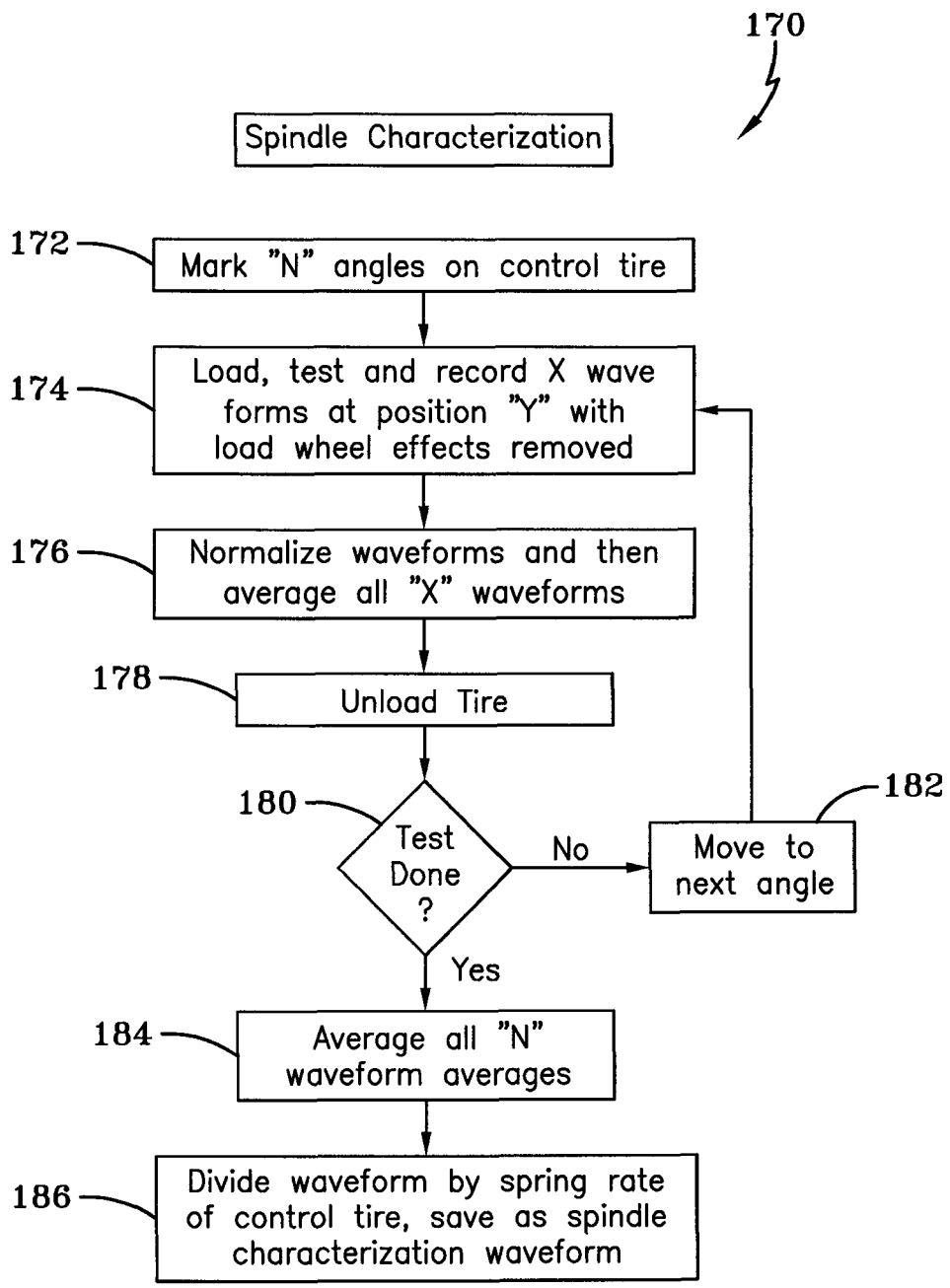
FIG. 5B is a flow chart showing an alternative spindle characterization process according to the concepts of the present invention.

Referring now to FIG. 5B, another embodiment of a spindle characterization process is designated generally by the numeral 170. In this process, a relatively smaller number of tires than the previous embodiment can be tested to generate a spindle characterization waveform.

The process 170 starts by testing any single tire, preferably a tire with low RPP similar as to what is desired during load wheel characterization. The test parameters are set up to operate at the normal testing inflation pressure and load for the chosen tire model. N (any number) separate tests should be performed, where the tire is rotated at N different positions (angles) around the spindle. Each of the N tests are averaged, and the resulting average waveform is designated as the spindle characterization for that specific spring-rate tire. At step 172, a technician will mark N evenly-spaced angles around a control tire with chalk or other similar marking material. The tire is oriented to be positioned on the spindle at the first angle. Next, at step 174, the technician chucks up and inflates the tire and advances the load wheel to a proper testing position to contact the control tire. After a predetermined number (for example 10) of revolutions, the tire settles into position on the load wheel in a manner similar to the load wheel characterization. And at step 174, the controller records any number, such as 15, of tire waveforms (revolutions of force data) from the control tire as it is spinning, one revolution after another. Each revolution measurement begins and ends at the same exact spindle position. Each recorded waveform must have all load wheel influence subtracted out. In other words, the load wheel must already be characterized before beginning this procedure. As each of the 15 waveforms are being recorded, each waveform is normalized at step 176 by subtracting all the values in the waveform by the average of the waveform. All 15 normalized waveforms are then averaged together to calculate the resulting waveform at angular position "N." Next at step 178, the load wheel is unloaded, the tire deflated and the tire chuck is moved down. At step 180, the controller and/or technician determines whether all the angular positions "N" have been evaluated or not. If not, then at step 182, while keeping the upper and lower rims of the spindle assembly fixed in place (i.e. the upper and lower rims of the spindle are not moved), the technician rotates the tire 1/Nth of a revolution (i.e. to the next marked angle) and repeats steps 174-180 for the remaining (N−1) angles of the tire.

Next, at step 184, the controller averages all N waveforms together to calculate the spindle characterization waveform for the given spring-rate tire. Finally, at step 186, the controller divides each value in the spindle characterization waveform by the spring-rate of the tire, then stores the resulting waveform in computer memory maintained by the controller.

For all subsequent production tires being tested, all values in the stored waveform are multiplied by each tire's unique spring rate wherein the tire's spring-rate is previously derived. This creates a new individual waveform that can be used to subtract out the effects of the spindle for that specific tire. As the tire is tested, each value in the tire's test waveform is then subtracted by the corresponding value in the individual spindle characterization waveform. It is assumed that the subsequent test tire waveforms are oriented as to begin and end at the same spindle encoder position as the original spindle characterization was calculated as will be described below.

In the present spindle characterization embodiment, the obtained "resolution" of the spindle characterization waveform increases for each additional N different angles that are measured around the spindle. It should be known that the value chosen for N should not be equal to or a multiple of any repeating features in the tire makeup or construction. For instance, if a tire is produced using a 9-segmented mold, then using a value of 9 for N will produce a spindle characterization waveform that is biased toward the imperfections or patterns of each segment in the mold and not to the runout of the rims on the spindle.

For instance, on a 9-segment-molded tire, good results are obtained with N=7 or 11 different angles. It should be known that prime numbers where N is at least 7 and as many as 31 are all good choices.

Figure 6:
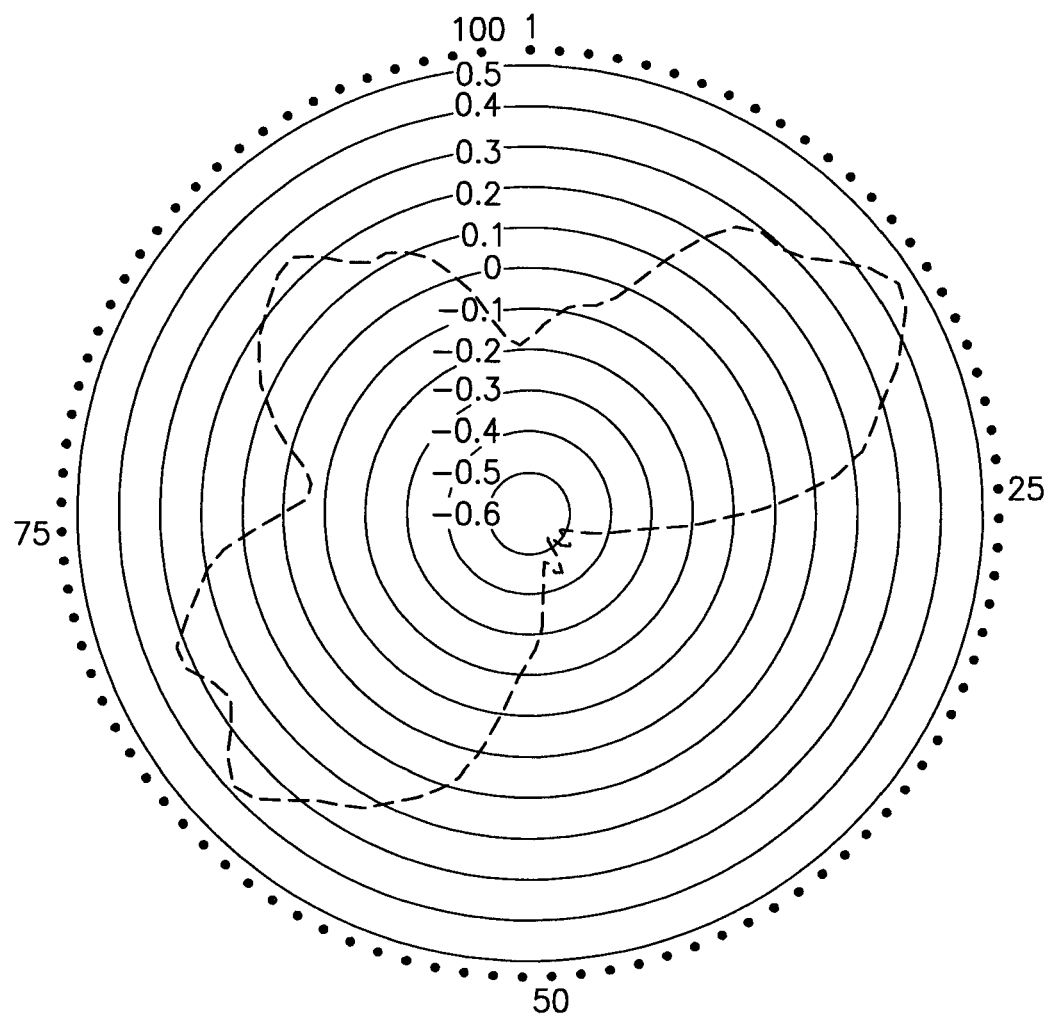
FIG. 6 is an exemplary spindle characterization waveform used in the analysis of a tire being tested by the tire uniformity machine.

As seen in FIG. 6, an exemplary spindle characterization waveform is shown. As such, each tire's waveform is compensated by the spindle characterization waveform based on the tested tire's known spring-rate value so as to provide a final result that is then compared to the known desirable parameters for tire uniformity. Skilled artisans will appreciate that if the tire uniformity machine undergoes any mechanical changes or stress, such as changing the rims or other component of the upper chuck assembly or some physical impact event occurs, then the "Tire Waveforms" buffer should be reset and the control tires once again be tested before recomputing a spindle characterization.

Figure 7:
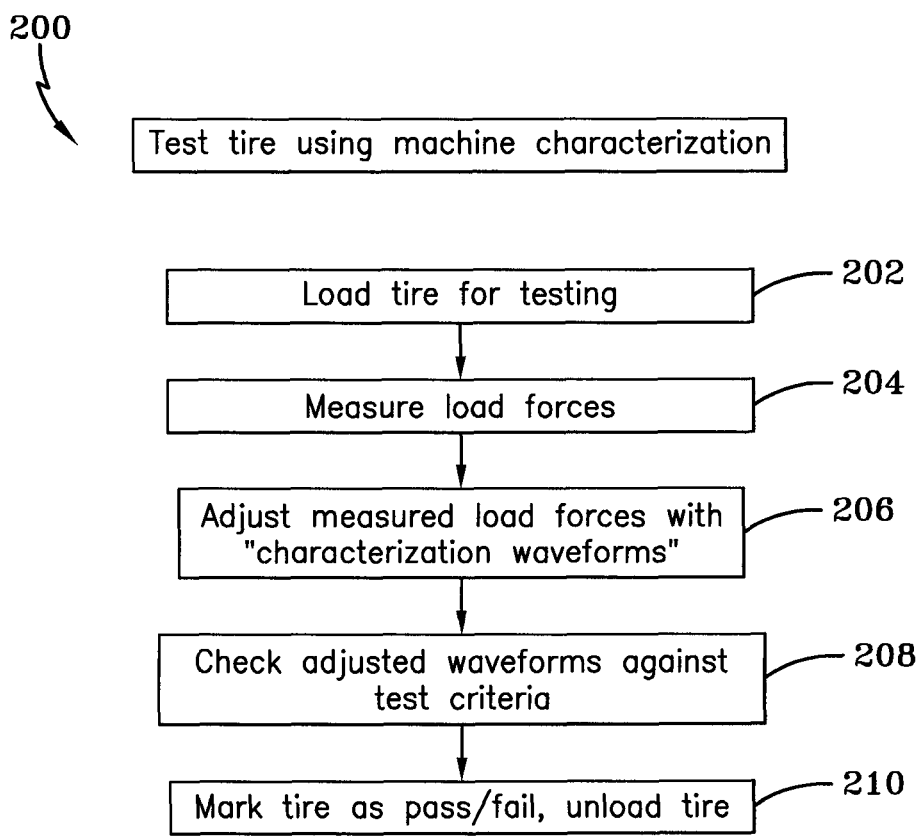
FIG. 7 is a flow chart illustrating testing of tires using the machine characterization waveforms.

Referring now to FIG. 7, a tire test utilizing machine characterization waveforms is designated generally by the numeral 200. In this process, the tire under test is loaded into the machine at step 202 and the load forces are measured by moving the load wheel into contact with the tire as it rotates. These load forces are measured at step 204 and then at step 206 the computer adjusts the measured load forces with the extrapolated characterization waveform determined in the load wheel characterization process 100 and/or the spindle characterization process 150. After these load forces are adjusted, then at step 208 the adjusted waveforms are checked against the test criteria which defines whether certain values of the tire under test are within an acceptable range or not. Then at step 210, the tire under test is marked as either acceptable or unacceptable with a pass/fail designation. Those tires that are passed are allowed to proceed in the tire production process, while the unacceptable tires are withdrawn from the manufacturing process and undergo further evaluation.

Figures 8, 8A:
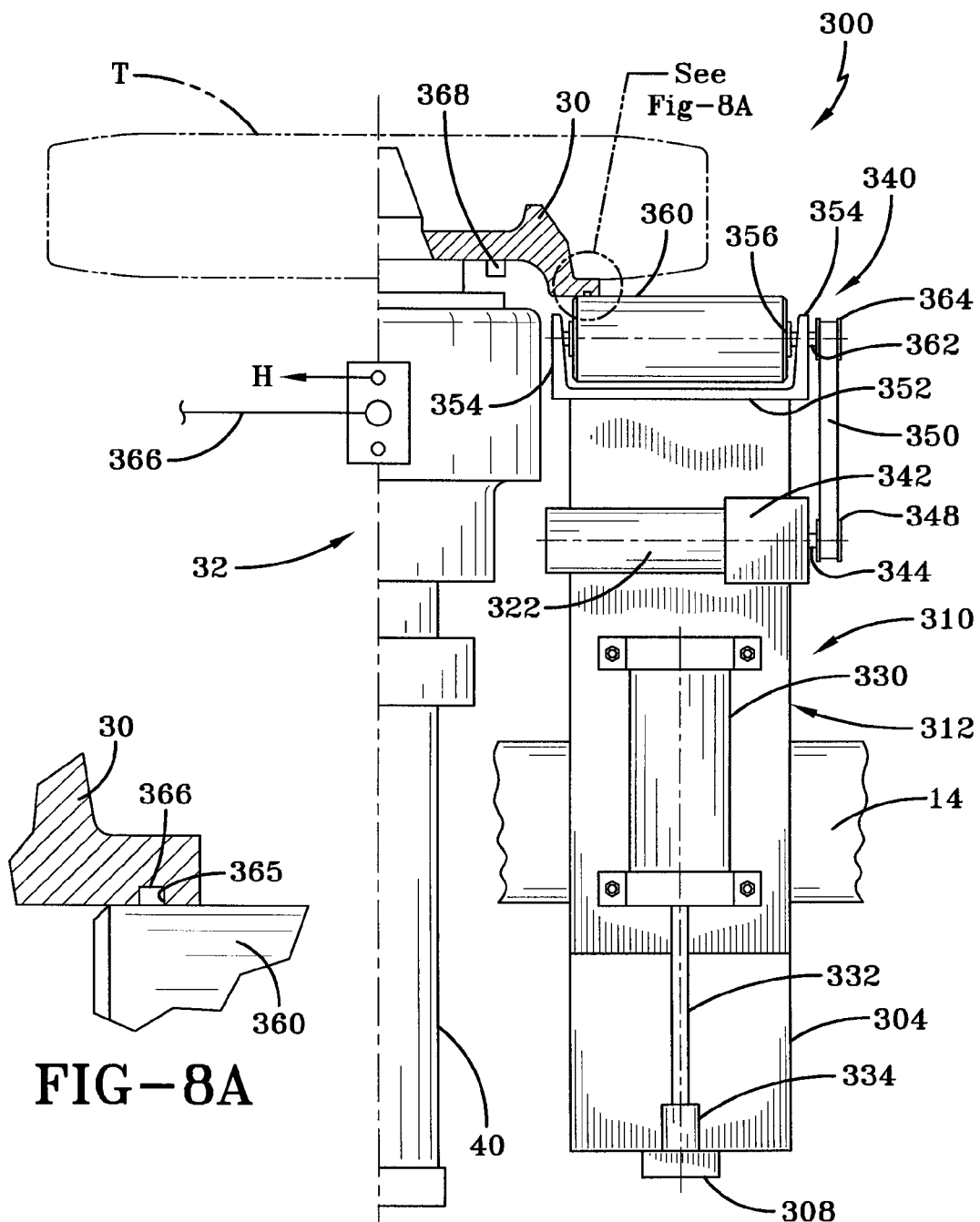
FIG. 8 is a front elevational view of a spindle alignment assembly according to the concepts of the present invention wherein the assembly is used with the tire uniformity machine shown in FIG. 1.
FIG. 8A is an enlarged view of an alternative embodiment roller assembly of the spindle alignment assembly engaging an underside of a rim that is part of the tire uniformity machine.
Figure 9:
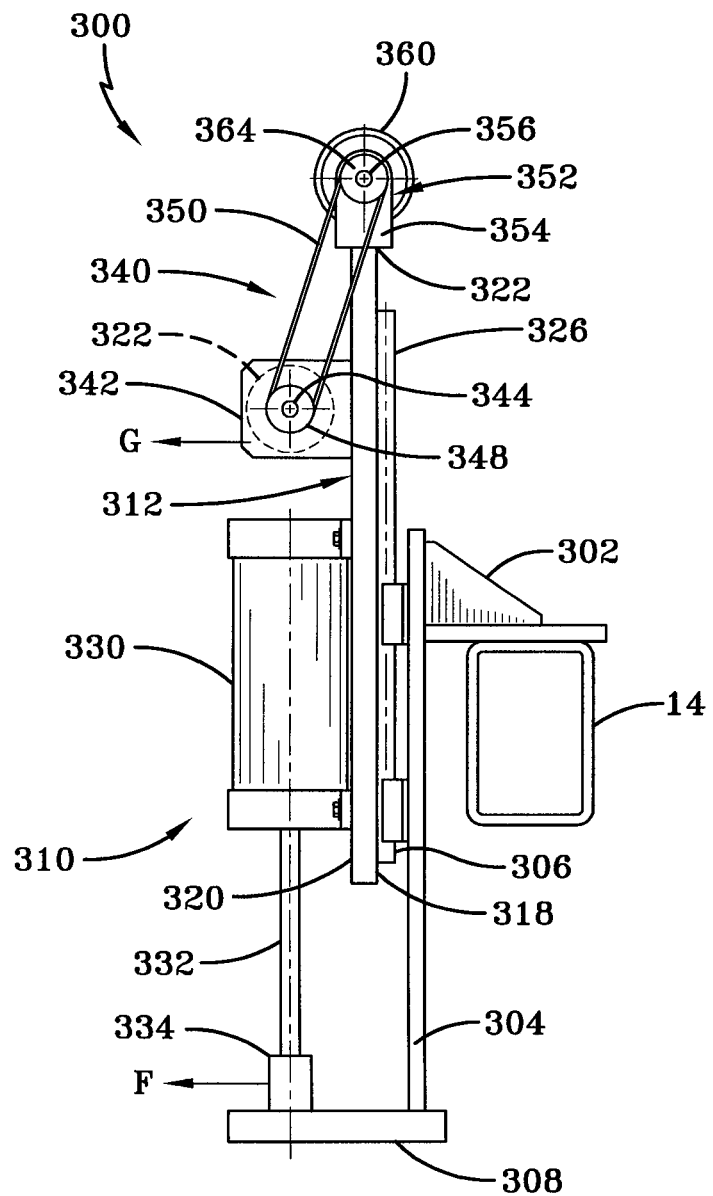
FIG. 9 is a side elevational view of the spindle alignment assembly.
Figure 10:
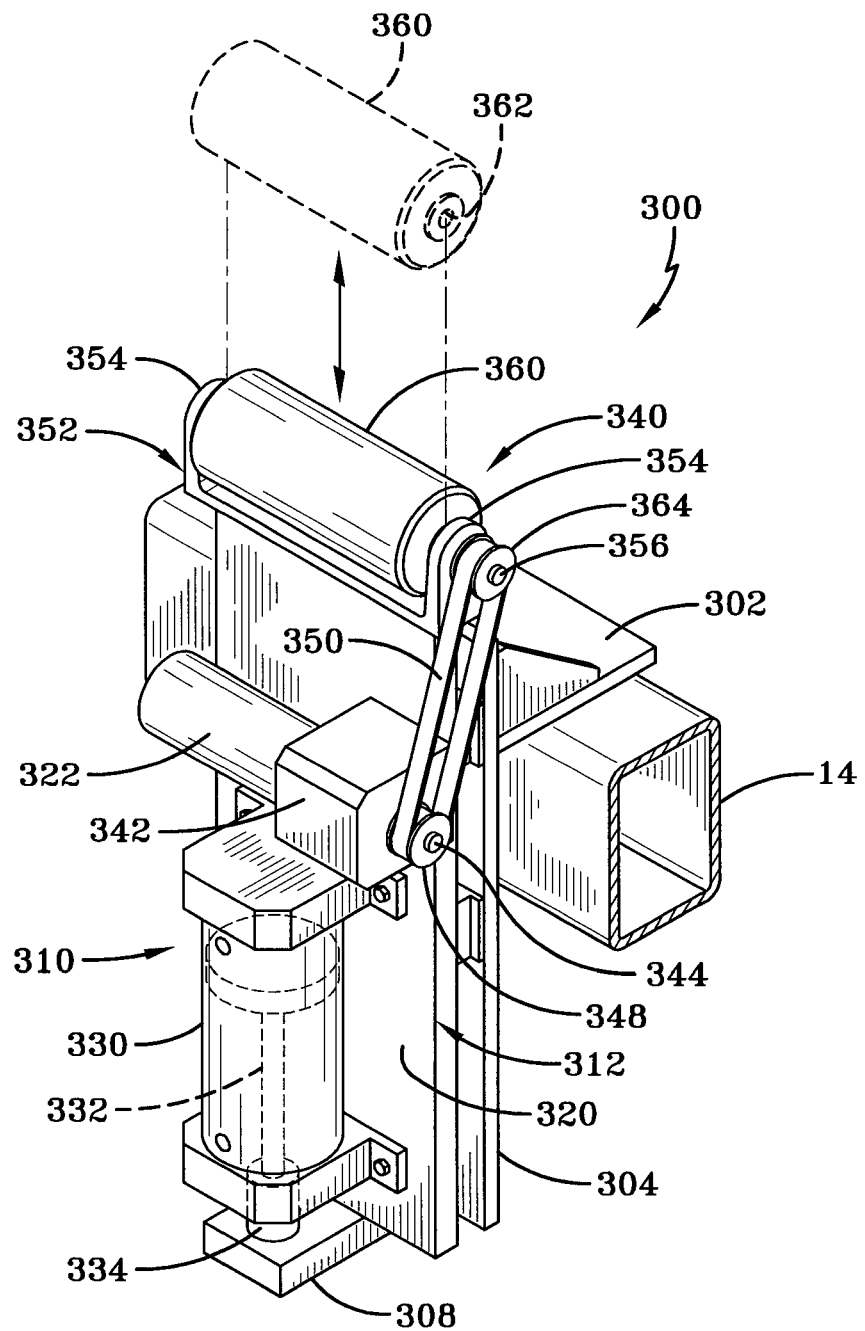
FIG. 10 is a perspective view of the spindle alignment assembly.

Referring now to FIGS. 8-10, a spindle alignment assembly is designated generally by the numeral 300. The spindle alignment assembly 300 is used in conjunction with the tire uniformity machine 10 previously described and shown in FIGS. 1-7. As will become apparent as the description proceeds, the spindle alignment assembly 300 is utilized to align the lower spindle with the upper spindle so as to provide for a more accurate spindle characterization which in turn results in more accurate testing of the tire. The assembly 300 may be mounted to a frame member 12, 14 or 16, and in the embodiment shown the assembly 300 is attached to frame member 14. The spindle alignment assembly functions to engage the lower spindle and chuck assembly 32 and in particular the rim 30. The assembly 300 then rotates the rim 30 to a predetermined rotational or angular position. As will be described, this rotational alignment is done to align the rotational position of the lower spindle and chuck assembly with the upper spindle and chuck assembly 34. In other words, the upper spindle and lower spindle are angularly aligned with one another each time a tire is received in the machine 10 and tested. In other words, each time a new tire is received the upper and lower spindle and chuck assemblies are at the same relative position to one another.

The spindle alignment assembly 300 includes a mounting bracket 302 which may be welded or otherwise secured to a frame member 14 or other structural component of the tire uniformity machine 10. Extending substantially perpendicularly from the mounting bracket 302 is a stationary frame 304. At least one vertical guide rail 306 may be secured to the stationary frame. In the embodiment shown there are two vertical guide rails on the side of the stationary frame 304 opposite the mounting bracket 302. It will be appreciated that if multiple guide rails 306 are provided, they will be aligned in parallel. It will be further appreciated that other embodiments may utilize other guide mechanisms, such as slots or other features. A base plate 308 is secured to an end of the stationary frame 304 and provides a bearing surface. In some embodiments the base plate may be structurally supported by a floor which also supports the machine 10.

A linear rail assembly 310 is slidably mounted to the stationary frame 304. The assembly 310 includes a carrier plate 312 which has a guide side 318 opposite a component side 320. The carrier plate 312 is also provided with a roller end 322 which is opposite the end closest to the base plate 308. At least one carrier rail 326 is provided on the guide side 318 and slidably engages the vertical guide rails 306 provided by the stationary frame 304. It will be appreciated that the carrier rails 306 allow for vertical movement of the carrier plate 312. In other words, the carrier plate 312 may move up and down with respect to the stationary frame 304.

Mounted on the component side 320 may be an air cylinder 330 from which axially extends a piston 332. One end of the piston 332 is connected to an alignment coupling 334 mounted to the base plate 308. The alignment coupling 334 receives an input F from the controller 90 so as to control operation of the air cylinder and, as a result, the vertical position of the liner rail assembly 310 in relation to the frame 304. Skilled artisans will appreciate that the cylinder 330 may be configured to operate hydraulically or electrically.

A roller assembly 340 is also mounted to the component side 320 and in particular to the roller end 322. The roller assembly 340 includes a pulley motor 342 which is mounted to the component side 320. Extending axially from the pulley motor 342 is a drive shaft 344. The motor 342 receives an input G from the controller 90 so as to control operation of the motor. A drive pulley 348 is connected to the drive shaft 344 and may be configured in any way so as to control rotational movement of a timing belt 350.

Associated with the roller assembly 340 is a movable frame 352 which is mounted to the roller end 322. The movable frame 352 may be mounted on at least one of the guide side 318, the component side 320 and the roller end 322, or on all three surfaces. In any event, the movable frame 352 includes a pair of opposed flanges 354 wherein each flange maintains a journal 356. A rubber roller 360 is received between the opposed flanges 354 and a shaft 362 axially extends from both ends which are rotatably received in a corresponding journal 356. A shaft 362 extends through the flange 354 and includes a driven pulley 364 which is coupled to the drive pulley 348 by the timing belt 350.

In an alternative embodiment shown in FIG. 8A, the roller 360 may be provided with a plurality of gear teeth 365. The teeth 365 are configured to mesh with mating sockets 366 that are provided by an underside of the rim 30. The teeth 365 and mating sockets 366 may be configured so as to be easily engaged by one another. And it will be appreciated that the teeth could be provided by the rim and the sockets by the roller.

A flag 368 or other similar indicia may be mounted to an underside of the rim 30. A proximity switch 366 may be mounted to the lower chuck and spindle assembly 32 so as to be able to detect the flag 368 when the rim 30 is rotated to a particular orientation. The proximity switch 366 generates an input H which is received by the controller 90. Accordingly, when input H indicates that the flag 368 is detected by the proximity switch 366, the precise angular orientation of the lower rim and, accordingly, the connected lower spindle and chuck assembly is known. In other words, the angular orientation of the spindle can be determined by knowing the position of the flag and, if needed, rotating the rim and associated spindle to a desired location.

In operation, the controller 90 is operated so as to align the lower spindle with the upper spindle. As previously described, the controller receives input from the encoder 56 to know the precise angular orientation of the upper spindle 50. With the angular position of the upper spindle known, the controller controls operation of the spindle alignment assembly 300 so that the lower rim 30 can be moved to an angular orientation that is aligned with the upper spindle's angular orientation. Specifically, the controller 90, knowing the angular orientation of the upper spindle from the encoder 56, generates a signal so as to move the linear rail assembly 310 into a position such that the roller assembly 340 engages the rim 30. In other words, the controller 90 generates input signal F which is received by the alignment coupling 334 and either hydraulic or air pressure is utilized to move the cylinder piston 332 upwardly so the rubber roller 360 engages the rim 30. Once this engagement is complete, the controller 90 generates a signal that is received by the pulley motor 342 which begins rotation of the drive pulley 348 which in turn causes rotation of the driven pulley 364 by the belt 350 so as to rotate the rubber roller 360. This rotation is transferred to the rim so that the rim is angularly oriented so as to match the angular position of the upper spindle. If additional force is required, the roller 360 and the rim 30 may be provided with gear teeth 365 and mating sockets 366 so as to provide more than a frictional force to move the rim. In either variation, the rotation continues until the proximity switch 366 detects the flag 368 or until the rim has been rotated a predetermined amount after detection of the flag. At this time, the controller stops rotation of the drive pulley 348 and then signals the piston to lower the roller assembly away from the rim. With the spindles aligned, the controller initiates the operations required to secure the tire in place by the chuck assemblies 32 and 34 and complete the desired testing operations.

With the mechanical operation and procedure of aligning the upper spindle with the lower spindle described, it will be appreciated that the characterization of the forces imparted by both the upper and lower spindles to the tire as it is being tested by the load wheel can be determined.

Figure 11:
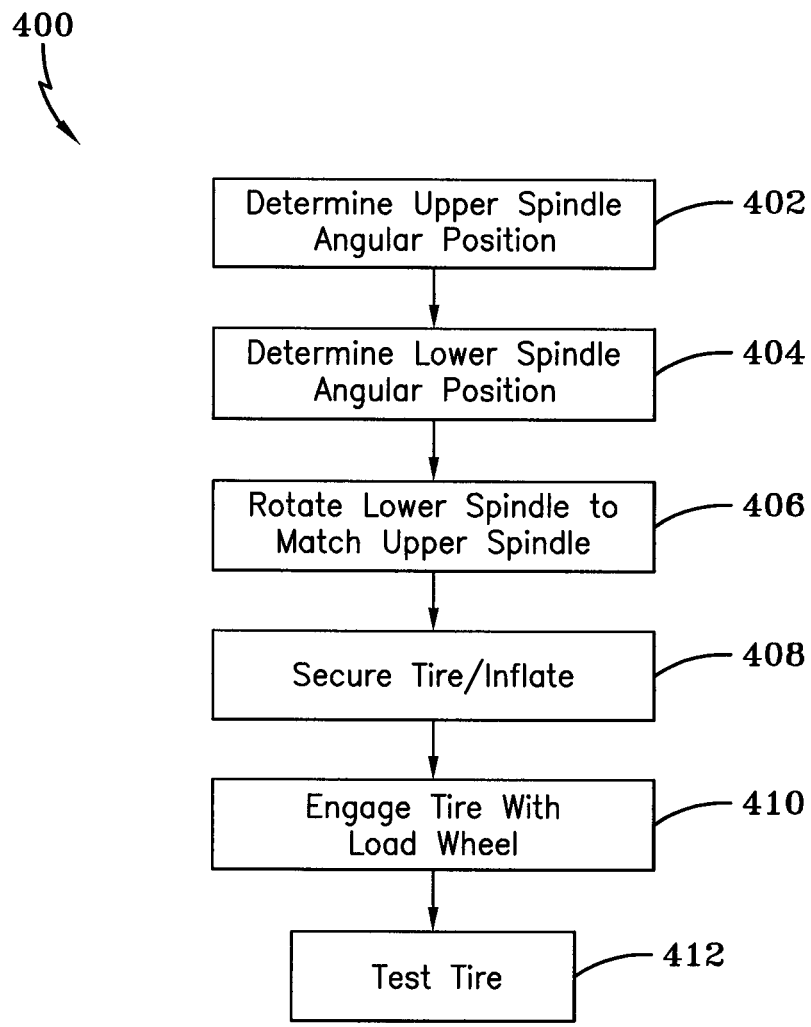
FIG. 11 is a flow chart showing an alternative spindle characterization process according to the concepts of the present invention and a related tire testing process.

Accordingly, referring now to FIG. 11, a methodology for the operation of the spindle alignment assembly in conjunction with the tire uniformity machine 10 is designated generally by the numeral 400. At step 402, the upper spindle's angular position is determined. As described, this is provided by the encoder 56 which generates input received by the controller 90. Next, at stop 404 the lower spindle's angular position is determined and, if not already in alignment with the upper spindle, then at step 406 the lower spindle is rotated by the alignment assembly 300 as previously described to match the angular position of the upper spindle. When the alignment is completed, the alignment assembly disengages from the rim 30. At this time, the tire that is to undergo the test is secured between the rims by moving the chuck assemblies in their appropriate direction and then inflating and rotating the tire. Next, the tire under test is engaged by the load wheel 70 and tire is tested with characterization waveforms applied at step 412. This characterization process is fully shown in FIGS. 5A and B as described above.

Skilled artisans will appreciate that by aligning both the upper spindle and lower spindle with one another that any out of roundness of the rims or other structural features in the upper and lower spindle assemblies and how they apply forces to the test tire can be accounted for and compensated for in the characterization waveforms. Accordingly, after the spindle forces have been properly characterized, the spindles are aligned at step 406 for each tire that is to undergo testing. In other words, after a characterization waveform is obtained, that waveform can be utilized in testing tires in a manner described in regard to FIG. 7.

Based on the foregoing the advantages of the present invention are readily apparent. By characterizing the components of the machine, those characterizations can be used to accurately identify high spots and low spots on the load wheel and/or adjust for spindle variations so as to accurately determine the characteristics of a machine that is testing a tire. Moreover, by aligning the upper and lower spindles with one another, their forces can be more accurately characterized. In other words, if the upper and lower spindles are not aligned with one another during the characterization and/or testing process, any number of angular and force combinations may be realized which would mis-characterize the spindle forces and result in less than ideal tire uniformity tests. In any event, with these improved procedures the characteristics can be updated during the useful life of the load wheel, spindle components, or other machine changes to ensure that the measurements being detected are accurate. This allows for adjustments to the testing parameters based on imperfections in the load wheel and other components of the machine so as to eliminate any out of roundness or other problems with the machine. By accurately determining nonuniformity of a tire utilizing the machine characterization waveforms, the reliability of the tire test results are increased.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A tire uniformity machine, comprising:
an apparatus for receiving and rotating a tire, said apparatus including opposed spindles for receiving, inflating and rotating the tire, and a load wheel applied to the rotating tire to obtain tire test results;
a spindle alignment assembly associated with said opposed spindles to align said spindles with one another each time a tire is received; and
at least one characterizing device associated with components of said apparatus to characterize forces of said opposed spindles, wherein said characterized forces are used in adjusting tire test results.

2. The machine according to claim 1, further comprising:
a computer, said at least one characterizing device generating a characterizing signal receiving by said computer which uses said characterizing signal to adjust the tire test results.

3. The machine according to claim 2, further comprising:
a flag associated with one of said opposed spindles; and
a proximity switch observing said flag and generating a proximity signal received by said computer;
said computer controlling said spindle alignment assembly so that said first and second spindles are aligned with one another based on said proximity signal.

4. The machine according to claim 3, wherein said apparatus includes a rim associated with each said spindle;
said spindle alignment assembly comprising:
a linear rail assembly slidably movable and controlled by said computer; and
a roller assembly mounted to said liner rail assembly, said roller assembly having a driven roller controlled by said computer that engages said rim by movement of said liner rail assembly, wherein said driven roller moves said rim and associated spindle into alignment with said other spindle.

5. The machine according to claim 4, wherein said driven roller has a plurality of teeth and wherein said rim has a plurality of sockets that are engaged by said plurality of teeth to assist in moving said rim.

6. The machine according to claim 3, further comprising:
at least one load cell associated with said load wheel and generating a load cell signal received by said computer;
an encoder associated with a first spindle extending from one of the chuck assemblies and generating positional signals received by said computer;
said computer processing said positional signal and said load cell signal after alignment to generate a spindle characterization waveform for a reference tire.

7. The machine according to claim 6, wherein said computer receives said positional signal and said load cell signal for each reference tire and generates a Tire Waveforms buffer.

8. The machine according to claim 7, wherein said computer averages the values in said Tire Waveforms buffer to generate an average Waveform which is applied to a production tire which is rotated with aligned spindles.

9. A method for testing tires, comprising:
receiving at least one control tire at a time in an apparatus, each said control tire having a known characteristic;
angularly aligning spindles for each said at least one control tire received to a same angular position;
applying a load wheel to said at least one control tire and generating a load wheel force;
detecting an angular position of said load wheel;
correlating said angular position of said load wheel with said load wheel force; and
generating a characteristic waveform of said spindles from said angularly aligned spindles, said angular position of said load wheel, and said load wheel force.

10. The method according to claim 9, further comprising:
receiving a test tire in said apparatus;
angularly aligning said spindles and then securing said test tire;
applying said load wheel to said test tire and generating a test tire load force;
detecting an angular position of said load wheel;
correlating said angular position of said load wheel and said aligned spindles' angular position with said test tire load force;
generating a test tire waveform from said load wheel angular position, and said aligned spindles' angular position, and said test tire load force; and
adjusting said test tire waveform with said characteristic waveform.

11. The method according to claim 9, further comprising:
determining an angular position of an upper spindle;
rotating a lower spindle to an angular position that matches said angular position of said upper spindle; and
securing and then rotating said control tire.

12. The method according to claim 11, further comprising:
linearly moving a rail assembly into proximity with a lower rim coupled to a lower spindle;
rotating a roller maintained by a roller assembly coupled to said rail assembly so as to angularly re-position said lower rim and said lower spindle to match an angular position of an upper spindle; and
linearly moving said rail assembly out of proximity with said lower rim after said lower and upper spindles are aligned.

13. The method according to claim 12, further comprising:
attaching a flag to said lower rim;
detecting said flag with a proximity switch to determine said lower spindle's angular position; and
stopping rotation of said roller when said lower spindle's angular position matches said upper spindle's angular position.

14. The method according to claim 12, further comprising:
providing said roller with either a plurality of teeth or a plurality of sockets;

providing said rim with either a plurality of sockets or a plurality of teeth; and mating said plurality of teeth with said plurality of sockets so as to assist in angularly re-positioning said lower rim and said lower spindle during the rotating step.

* * * * *